United States Patent [19]

Allen et al.

[11] Patent Number: 5,176,248

[45] Date of Patent: Jan. 5, 1993

[54] BELTED CHAIN

[75] Inventors: Randy L. Allen; Ronald D. Cape, both of Gering, Nebr.

[73] Assignee: Lockwood Corporation, Gering

[21] Appl. No.: 827,752

[22] Filed: Jan. 29, 1992

[51] Int. Cl.⁵ ............................................. B65G 17/06
[52] U.S. Cl. ................................... 198/850; 209/307; 171/126
[58] Field of Search ................ 198/848, 850; 209/307, 209/308, 665; 171/126, 132

[56] References Cited

U.S. PATENT DOCUMENTS

| | | | |
|---|---|---|---|
| 796,947 | 8/1905 | Thomas | 198/850 |
| 4,553,663 | 11/1985 | Johnson | 198/850 |
| 4,724,909 | 2/1988 | Link | 198/850 |

Primary Examiner—Joseph E. Valenza
Attorney, Agent, or Firm—Dean P. Edmundson

[57] ABSTRACT

An improved belted chain is described in which there are a plurality of pairs of chain rods secured to spaced-apart carriers and a central belt. The inner ends of the chain rods in each pair are aligned end-to-end with each other and then secured to the central belt. The outer ends are secured to the spaced-apart carriers. Preferably the central belt is composed of rubber. The chain rods in each pair are able to be flexed relative to each other without danger of breaking the rods.

12 Claims, 1 Drawing Sheet

BELTED CHAIN

FIELD OF THE INVENTION

This invention relates to conveyer systems. More particularly, this invention relates to belted chain conveyer systems. Even more particularly, this invention relates to belted chains for use in harvesting and processing equipment.

BACKGROUND OF THE INVENTION

Belted chains are used in various types of harvesting equipment, e.g., potato harvesters, sugar beet harvesters, etc. to convey product from one location to another. For example, on potato harvesters belted chains are used to lift and convey potatoes from the point they are removed from the ground to a truck or trailer.

The belted chain is an endless assembly which comprises a plurality of elongated rods secured at their ends to spaced-apart carriers (e.g., belts) which are driven by pulleys, for example. Typically the central portion of each rod is also secured to a centrally located belt (e.g., by means of rivets or mechanical fasteners). The rods are parallel to each other and slightly spaced apart. They extend transversely to the direction of travel of the chain. Dirt and other debris can fall through the chain between the rods as produce (e.g., potatoes) are being conveyed by the chain.

The conventional belted chain utilizes chain rods which extend the full width of the conveyer, i.e., each rod is secured at its opposite ends to the carriers on the opposite edges of the conveyer. The central portion of each rod is secured to a narrow central belt (e.g., about 60 mm. wide). As the conveyer moves with the weight of product on it, the rods are subjected to varying degrees of stress. Because the rods extend across the entire width of the conveyer and are also secured to the central belt, the assembly does not allow for flexibility in the belted chain across the width of the conveyer. As a result, the chain rods often break (e.g., near the center where the rod is secured to the central belt).

It is expensive and time-consuming to perform repairs on the assembly to replace broken chain rods. Alternatively, the entire assembly may be taken out of the equipment and replaced.

Another type of prior belted chain assembly involves chain rods which extend half the width of the conveyer and are secured between one of the edge carriers and the narrow central belt. The rods on opposite sides of the central belt are staggered or off-set so that the rods are not aligned end-to-end with each other. The end of each rod which is secured to the central belt extends across the full width of the central belt. Consequently, this type of belted chain does not provide any significant improvement in flexibility across the width of the conveyer as compared to the belted chain rods which extend across the full width of the conveyer.

There has not heretofore been provided a belted chain having the significantly improved flexibility provided by the belted chain of this invention.

SUMMARY OF THE PRESENT INVENTION

In accordance with the present invention there is provided an improved belted chain assembly which enables internal stress on the assembly to be relieved so that the chain rods do not fatigue and break during normal operation of the assembly. In one embodiment the improved belted chain assembly of the invention comprises:

(a) first and second elongated carrier members, wherein the carrier members are spaced apart and are parallel to each other;
(b) an elongated central belt member disposed between and parallel to the carrier members; and
(c) a plurality of pairs of elongated rod members, wherein the rod members in each pair are aligned end-to-end with each other; wherein each rod member includes inner and outer ends; wherein the outer ends are secured, respectively, to the first and second carrier members and the inner ends are secured to the central belt member.

The central belt has a width of at least about 100 mm. The ends of each pair of chain rods are aligned with each other but are not touching. The chain rods in each pair are able to flex with respect to each other. This feature significantly reduces failures of the chain rods. It also provides for greater flexibility of the belted chain assembly across its width.

Because the central belt used herein is much wider than the central belt used in conventional belted chain conveyers, the belted chain of the invention exhibits significantly improved strength as compared to conventional belted chain conveyers. Even if one of the rod members in the belted chain assembly of this invention should break, the time and cost involved in replacing a broken rod is much less than that involved in replacing a broken rod in a conventional belted chain conveyer. Also, the cost of a single rod which extends across the full width of the conveyer is much greater than the cost of two rods which each have a length equal to half the width of the conveyer.

The improved belted chain assembly of the invention exhibits increased useful life over conventional belted chain conveyers and also reduces the cost of down-time in the field.

Other advantages of the belted chain of the invention will be apparent from the following detailed description and the accompanying drawings.

BRIEF DESCRIPTION OF THE DRAWINGS

The invention is described in more detail hereinafter with reference to the accompanying drawings, wherein like reference characters refer to the same parts throughout the several views and in which.

DETAILED DESCRIPTION OF THE INVENTION

Figure 1:
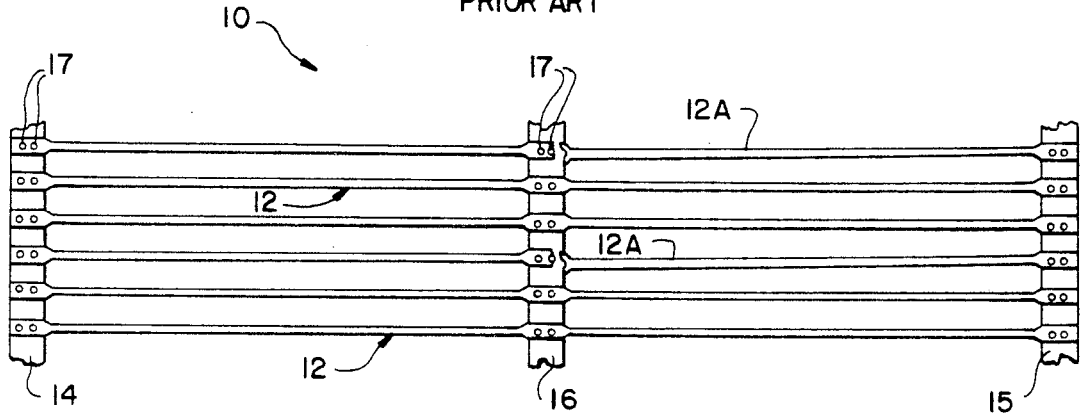
FIG. 1 is a top view illustrating a prior art belted chain design.

In FIG. 1 there is illustrated a conventional belted chain conveyer assembly 10 in which chain rods 12 extend completely across the full width of the belted chain assembly. Edge belts 14 and 15 are generally parallel to each other and extend along the length of the assembly. A centrally located belt 16 also extends along the length of the assembly. Typically the conveyer assembly comprises an endless belt which is supported on rollers at the ends of the assembly. There may also be transverse rollers at one or more intermediate positions for supporting the belts.

The chain rods 12 are typically composed of steel rod having a diameter less than about 0.5 inch. The length of each rod may be a few feet, depending upon the desired width of the conveyer.

As shown in FIG. 1, the opposite ends of each chain rod 12 are secured to belts 14 and 15 (e.g., with rivets 17, bolts or other mechanical fasteners). The central portion of each chain rod is also secured to central belt 16 by similar means.

Thus, the belted chain assembly is quite rigid and inflexible across its width. Consequently, during use of the conveyer to move products, stress applied to the chain rods is not easily dissipated. As a result, it is commonplace for some of the rods to break, usually near the central portion of the rod at a rivet hole where the rod is secured to the central belt. This is illustrated in FIG. 1 where some of the chain rods have broken, leaving rod portions 12A secured at one end to the outer belt 15 and also leaving a free end adjacent central belt 16. These broken rod sections cannot easily or reliably support weight and consequently are not effective for transporting product. Furthermore, the broken rod sections can cause damage to other portions of the equipment in which the conveyer is used. Thus, the broken rod sections should be replaced promptly, or else the entire belted chain conveyer should be replaced, in order to avoid damage to the equipment.

Figure 2:
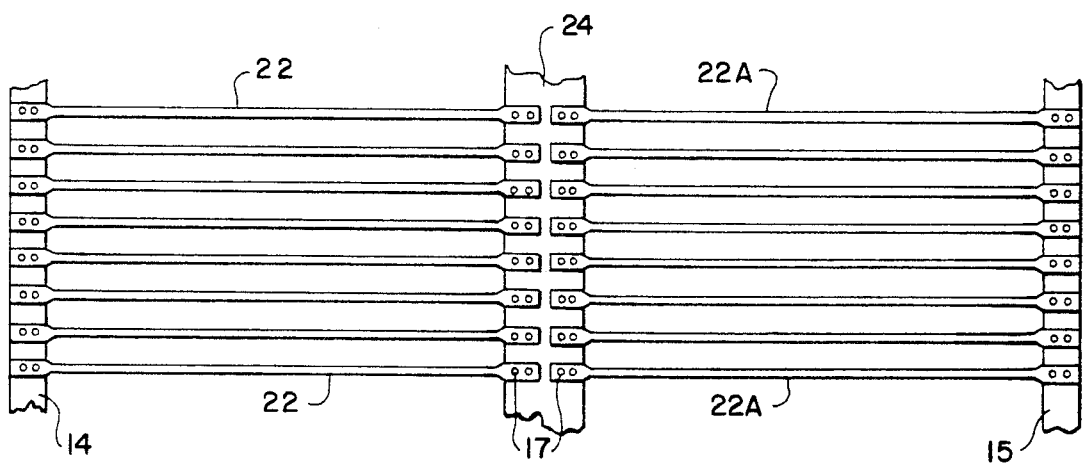
FIG. 2 is a top view showing the improved belted chain of this invention.
Figure 3:
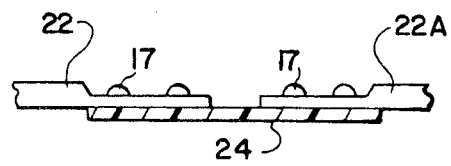
FIG. 3 is a cross-sectional view of the central portion of the improved belted chain of FIG. 2.
Figure 4:
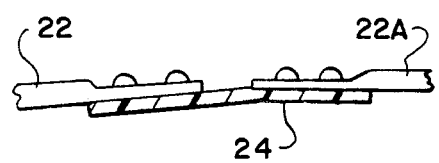
FIG. 4 is a cross-sectional view of the central portion of the belted chain of FIG. 2 illustrating the manner in which the abutting chain rods can flex relative to each other.

FIGS. 2-4 illustrate a belted chain assembly 20 of this invention comprising pairs of chain rods 22 and 22A which are aligned with each other in end-to-end fashion in the same plane. The outer ends of each rod are secured, respectively, to edge belts 14 and 15. The inner ends of each rod are secured to a rather wide central belt 24. The inner ends of the rods do not touch each other but are closely adjacent to each other, as illustrated. For example, the inner ends of rods 22 and 22A are separated by a distance of about 0.2-0.5 inch, and preferably are separated by about 0.35 inch.

The width of the central belt is at least about 100 mm. and may be as wide as about 150 mm. This is significantly wider than the width (typically about 60 mm.) of the central belt in the prior art conveyers. This extra width, coupled with the concept of using separate rods in end-to-end arrangement, provides for significantly improved flexibility in the central portion of the assembly and greatly reduces the tendency of the chain rods to break during operation.

The flexibility of the belted chain assembly of the invention is illustrated in the cross-sectional view of FIG. 4. The chain rods in each pair can be tilted or moved out of alignment with each other without subjecting the rods themselves to bending stresses. Rather, the wide central belt flexes to accommodate the various positions of the rods in each pair.

In the belted chain assembly of this invention various chain rod diameters can be effectively used. Typically, the diameter of the rods may vary from about 5/16 inch to ⅜ inch. The chain rods may be straight, or they may include portions which are above or below the plane of the conveyer. The chain rods may be rubber-covered, if desired. The spacing between adjacent pairs of rods may vary, e.g., from about 28 to 200 mm. Preferably the chain rods are composed of forged steel because of the high strength exhibited by such rods.

The carrier member along each outside edge of the belted chain assembly preferably comprises a flexible rubber belt. Other types of carrier members could also be used, if desired.

The thickness of the central belt may also vary (e.g., from about 8 to 20 mm.). The composition of the central belt may also vary. Typically it is composed of tough, durable and flexible rubber or similar material.

Thus, the belted chain assembly of this invention exhibit flexibility in the central portion thereof. This type of flexibility has not heretofore been provided by prior belted chain products.

Other variants are possible without departing from the scope of this invention. For example, the belted chain assembly may be used in various types of equipment. It may be driven by sprockets or by friction rollers, for example, if desired.

What is claimed is:

1. An elongated belted chain comprising:
   (a) first and second elongated carrier members, wherein said carrier members are spaced apart and are parallel to each other;
   (b) an elongated central belt member disposed between and parallel to said carrier members; wherein said central belt member comprises flexible rubber and
   (c) a plurality of pairs of elongated rod members, wherein said rod members in each said pair are aligned end-to-end with each other; wherein each said rod member includes inner and outer ends; wherein said outer ends are secured, respectively, to said first and second carrier members and said inner ends are secured to said central belt member.

2. A belted chain in accordance with claim 1, wherein said central belt member has a width of at least about 100 mm.

3. A belted chain in accordance with claim 1, wherein said inner ends of said rod members are separated by a distance in range of about 0.2 to 0.5 inch.

4. A belted chain in accordance with claim 1, wherein said rod members in each said pair are in essentially the same plane.

5. A belted chain in accordance with claim 1, wherein said inner ends of said rod members are riveted to said central belt member.

6. A belted chain in accordance with claim 1, wherein said carrier members comprise rubber belts.

7. In a belted chain assembly of the type including first and second elongated carrier members, an elongated central belt member disposed between and parallel to said carrier members, and elongated rod members secured to the carrier members, wherein the improvement comprises a plurality of pairs of elongated rod members, wherein said rod members in each said pair are aligned end-to-end with each other; wherein each said rod member includes inner and outer ends; wherein said outer ends are secured, respectively, to said first and second carrier members and said inner ends are secured to said central belt member; and wherein said central belt member comprises flexible rubber.

8. The improvement in accordance with claim 7, wherein said central belt member has a width of at least about 100 mm.

9. The improvement in accordance with claim 7, wherein said inner ends of said rod members are separated by a distance in range of about 0.2 to 0.5 inch.

10. The improvement in accordance with claim 7, wherein said rod members in each said pair are in essentially the same plane.

11. The improvement in accordance with claim 7, wherein said inner ends of said rod members are riveted to said central belt member.

12. The improvement in accordance with claim 7, wherein said carrier members comprise rubber belts.

* * * * *